United States Patent [19]

Tanaka et al.

[11] 3,959,049

[45] May 25, 1976

[54] PROCESS FOR PRODUCTION OF ARTIFICIAL LEATHERS HAVING AIR PERMEABILITY

[75] Inventors: Yoshinobu Tanaka; Hidehiko Maki, both of Kyoto; Tamio Ishiai, Wakayama; Tasaku Nishii, Wakayama; Singi Oota, Wakayama, all of Japan

[73] Assignee: Nippon Cloth Industry Co., Ltd., Kyoto, Japan

[22] Filed: June 26, 1974

[21] Appl. No.: 483,099

[30] Foreign Application Priority Data

July 4, 1973  Japan.............................. 48-74885

[52] U.S. Cl................................ 156/79; 156/246; 156/344; 260/2.5 AY; 264/46.3; 264/54; 264/257; 264/DIG. 5
[51] Int. Cl.².................... B29D 27/04; B32B 5/20; B32B 31/14
[58] Field of Search ............. 264/54, 48, 46.3, 257; 260/2.5 BD, 2.5 AY; 156/79, 246, 344

[56] References Cited
UNITED STATES PATENTS

| | | | |
|---|---|---|---|
| 2,764,565 | 9/1956 | Hoppe et al. ................... | 264/54 UX |
| 2,850,467 | 9/1958 | Livingood ........................ | 264/54 |
| 2,956,310 | 10/1960 | Roop et al. ..................... | 264/54 |
| 3,000,757 | 9/1961 | Johnston et al. .......... | 260/2.5 BD X |
| 3,047,449 | 7/1962 | Coble............................... | 264/54 X |
| 3,694,530 | 9/1972 | Wolfe .............................. | 264/48 |
| 3,830,760 | 8/1974 | Bengtson...................... | 260/2.5 BD |

FOREIGN PATENTS OR APPLICATIONS 664,192 6/1963 Canada.................................. 264/54
1,313,237 11/1961 France........................... 260/2.5 BD

*Primary Examiner*—Philip Anderson
*Attorney, Agent, or Firm*—Woodhams, Blanchard and Flynn

[57] ABSTRACT

A process for the production of artificial leathers having excellent air permeability and resembling a natural leather is provided, which comprises incorporating a catalyst, a foam stabilizer and, optionally, a pigment and other additive into an isocyanate-terminated polyurethane prepolymer formed by compounding a polyester diol derived from an aliphatic dicarboxylic acid with an organic polyisocyanate so that the [NCO]/[OH] ratio is within a range of from 2.0 to 4.0, to thereby form a substantially solvent-free paint having a viscosity adjusted to 70 to 1000 poises, coating the paint on a release paper in an amount of 50 to 400 g/m², applying the release paper to a substrate, allowing foaming and polymerization reactions to proceed in an atmosphere of a dry-bulb temperature of 40° to 95°C. and a relative humidity of at least 60%, passing the assembly, during the advance of said reactions, between two upper and lower rolls, the clearance of which is so adjusted that the foaming ratio is 2 to 4 in a polyurethane foam layer formed from the polyurethane prepolymer paint coating, further advancing the reactions, and peeling the release paper from the foam layer.

10 Claims, 1 Drawing Figure

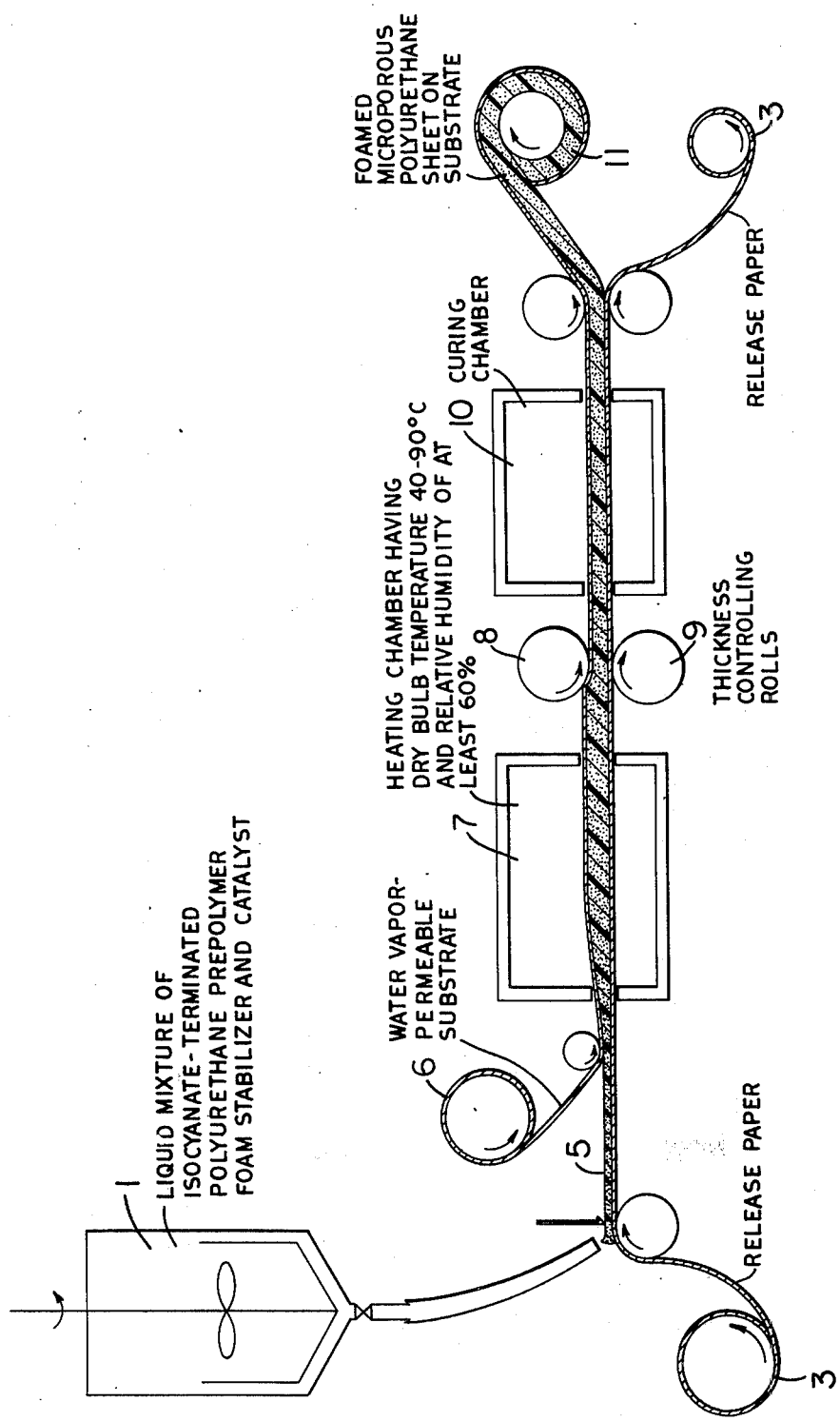

PROCESS FOR PRODUCTION OF ARTIFICIAL LEATHERS HAVING AIR PERMEABILITY

This invention relates to a process for the production of artificial leathers having excellent air permeability and resembling a natural leather in touch, appearance and feeling, which are provided with a soft layer of a polyurethane foam having a high surface strength.

Artificial leathers have heretofore been prepared ordinarily according to dry or wet methods. According to the customary dry method, an artificial leather is prepared by coating a solution of a macromolecular polymer such as a polyurethane resin, an amino acid resin and an acrylic resin on a release paper, evaporating the solvent from the coating to form a film, applying an adhesive on the film, bonding the adhesive-applied film to a substrate, heating the assembly and peeling off the release paper from the assembly. Artificial leathers prepared according to this method have substantially no air permeability, and their touch is quite different from excellent touch of natural leathers.

According to the wet method, an artificial leather is prepared by coating on a substrate a solution of a macromolecular polymer, for example, a dimethylformamide solution of a polyurethane resin or a solution of a nylon resin in calcium chloride-methanol, dipping the coated substrate in a solvent (generally water) which is a nonsolvent for the resin but is miscible with the solvent of the polymer solution, to thereby extract the solvent of the polymer solution and form a film, and drying the resulting product. The film formed by this method has a continuous microporous structure and hence, exhibits air permeability. However, in order to obtain excellent surface conditions in the resulting artificial leather, a very precise operation control is required, and this wet method is defective in that it is impossible to prepare easily excellent skin film layers having stable good qualities.

In either the dry or wet method for the preparation of artificial leathers, the polymer content is relatively low in the coating solution, and therefore, a large quantity of the organic solvent is released into air or water, which causes a problem of environmental pollution if no post treatment is conducted for the removal of the released organic solvent. However, considerable equipment expenses are needed for the recovery of such organic solvent. Further, physical properties and touch of artificial leathers obtained according to the above conventional dry and wet methods are still quite different from those of natural leathers.

It is known in the art that a polyurethane foam can be prepared by contacting an isocyanate-terminated polyurethane prepolymer (hereinafter referred to merely as "urethane prepolymer") with water and an active hydrogencontaining organic material to cause a foaming reaction. Since a layer of this polyurethane foam has a touch and air permeability quite similar to those of a natural leather, it has been considered that a composite structure comprising a substrate and a layer of this polyurethane foam would be an excellent artificial leather product.

However, it is generally difficult to prepare a paint composition for the formation of artificial leathers which comprises a polyurethane prepolymer as the main ingredient, and if such paint composition can be successfully prepared, a polyurethane foam layer formed from such paint composition through the above-mentioned foaming reaction has a surface strength much lower than that of an artificial leather prepared by employing a polyurethane solution according to the above-mentioned dry method (the solvent is evaporated by heating to coagulate the polymer) or the above-mentioned wet method (the paint solvent is extracted in a non-solvent to coagulate the polymer). Further, because of the influence of the foaming ratio, it is technically difficult to give an optimum thickness feeling to the resulting artificial leather.

Accordingly, in case a polyurethane foam is intended to be used as a surface layer of an artificial leather, the foaming ratio should be so adjusted as to attain conditions suitable for an artificial leather and the surface scratching strength of the polyurethane foam layer should be sufficiently improved; otherwise, no artificial leather applicable to practical uses can be obtained. However, there has not been established a technique that can provide a layer of a polyurethane foam having a satisfactory surface scratching strength, an excellent air permeability and a thickness feeling optimum for an artificial leather, while retaining the natural leather-resembling touch inherent of the polyurethane foam.

In view of such state of the art, we have made research works on urethane prepolymer compositions and the steps of preparing artificial leathers from these urethane prepolymer solutions, and as a result, we have succeeded in forming a layer composed solely of a polyurethane foam having touch, feeling and appearance resembling those of a natural leather and a good combination of an excellent air permeability and an excellent surface scratching strength while retaining completely excellent properties inherent of the polyurethane foam, without subjecting the surface of the resulting polyurethane foam to a particular post treatment such as a treatment with a particular paint for improving the surface scratching strength.

In the preparation of artificial leathers, there is frequently adopted a method of embossing the surface of a resin layer for making the surface conditions of the artificial leather resemble those of a natural leather. In general, such post treatment as am embossing treatment is conducted, or a resin coating layer is formed on an embossed release paper and the embossed release paper is peeled off, to thereby transfer the embossment pattern to the surface of the resin layer. In case it is intended to emboss an artificial leather composed of a polyurethane foam as in this invention, adoption of the former method is not preferred because foams are crushed under the embossing pressure. Accordingly, adoption of the latter method is considered, but if this method is simply applied to a polyurethane foam, because the foaming ratio under the reaction of foaming a urethane prepolymer is extremely high, the surface of the polyurethane foam is not closely contacted with the embossed inner face of an embossed release paper and a clear embossment pattern cannot be transferred sufficiently.

Though it is not a particular object of the present invention to transfer an embossment pattern to the surface of a polyurethane foam layer from an embossed release paper, if in practising the process of this invention as embossed release paper is employed, at the step of adjusting the foaming ratio, which is one of essential requirements of this invention and will be detailed hereinafter, adherence of the polyurethane foam layer to the embossed inner face of the release paper is not influenced by the foaming ratio and the embossment pattern can be transferred completely. Accordingly, at the above step of this invention, not only the adjustment of the foaming ratio but also the complete transfer of a clear embossment pattern can simultaneously be accomplished.

BRIEF DESCRIPTION OF THE DRAWING

The drawing is a schematic illustration of the process of the invention.

This invention relates to a process for the production of artificial leathers which are excellent especially in the surface scratching strength and air permeability, characterized by incorporating a catalyst, a foam stabilizer and, if desired, a pigment and other additive into a polyurethane prepolymer formed by compounding a polyester diol derived from an aliphatic dicarboxylic acid with an organic polyisocyanate so that the [NCO]/[OH] ratio, in which [NCO] indicates the isocyanate group equivalent and [OH] indicates the hydroxyl group equivalent, is within a range of from 2.0 to 4.0, to thereby form a substantially solvent-free polyurethane prepolymer paint (hereinafter referred to merely as "paint") having a viscosity adjusted to 70 to 1000 poises in vessel 1, coating the paint 5 on a release paper 3 in an amount of 50 to 400 g/m², applying the release paper to a substrate 6, contacting the assembly with moisture for 30 seconds to 5 minutes in an atmosphere having a dry-bulb temperature of 40° to 95°C. and a relative humidity of at least 60% in a chamber 7, to thereby allow foaming and polymerization reactions to proceed in the coating layer, passing the assembly, during the advance of said reactions, between two upper and lower rolls 8 and 9, the clearance between which can optionally be controlled, said clearance being so adjusted in view of the relation between the [NCO]/[OH] value and the amount coated of the paint that the final foaming ratio is 2 to 4, further advancing the reactions in a curing chamber 10, and peeling the release paper 3 from the resulting foam layer 11.

In this invention, it is possible to perform the surface treatment for improving the surface conditions of the resulting artificial leather, such as color, luster, touch and the like during conducting the above steps of this invention or after completion of all the steps of this invention.

The essential requirements of this invention are (1) the kind of the starting polyol and the ratio of the isocyanate group equivalent [NCO] to the hydroxyl group equivalent [HO] in the preparation of a polyurethane prepolymer, (2) the viscosity of the paint, (3) the amount of the paint coated on a release paper, (4) a high humidity atmosphere condition for advancing the reaction in the paint layer, (5) the clearance of two upper and lower rolls through which the paint layer is passed during the reaction, and (6) the time (the time during the advnce of the reaction) at which the paint layer is passed through the clearance between the two rolls. In this invention, by virtue of the synergistic effect attained by a mutual close combination of these requirements, it is made possible to obtain an artificial leather having an excellent air permeability and resembling a natural leather in respect to touch, appearance and feeling.

Each of these essential requirements of the present invention will now be described.

In this invention, the polyol to be used as one of the starting materials for the formation of a polyurethane prepolymer is limited to a polyester diol, and the polyester diol referred to herein includes all of polyols prepared by polycondensation of aliphatic dicarboxylic acids with straight or branched glycols or ether glycols.

As detailed hereinafter, in this invention the viscosity of the polyurethane prepolymer paint is limited within the specific range, and in order to attain this specific viscosity in the paint, the viscosity of the polyurethane prepolymer which is the main ingredient of the paint is of great importance. Namely, it is necessary to employ a urethane prepolymer having good liquid characteristics.

As is well known in the art, a polyurethane prepolymer is formed by the reaction between polyol and isocyanate components. The viscosity of this polyurethane prepolymer, namely the liquid characteristics, is greatly influenced by the starting polyol. In this connection, in this invention it is indispensable that the starting polyol, namely the polyester diol, should have a low viscosity (good liquid characteristics). In order to provide a polyurethane prepolymer having such viscosity or liquid characteristics as enabling attainment of the objects of this invention, it is preferred that at least two of glycols and ether glycols, differing in the carbon number, are used as the component to be polycondensed with the aliphatic dicarboxylic acid. In case only one kind of a glycol component is polycondensed with the aliphatic dicarboxylic acid, the resulting polyester diol has a melting point higher than 50°C. in many cases. If such polyester diol is employed, it is very different to obtain a polyurethane prepolymer having such liquid characteristics as required in this invention. In case at least two members selected from straight or branched glycols having 2 to 6 carbon atoms and ether glycols are chosen as the glycol component and they are polycondensed with at least one aliphatic dicarboxylic acid having 4 to 10 carbon atoms, most preferred polyester diols can be obtained.

Preferred examples of the aliphatic dicarboxylic acid include succinic acid, glutaric acid, adipic acid, pimelic acid, suberic acid, azelaic acid and sebacic acid. As preferred examples of the straight or branched glycol, there can be mentioned ethylene glycol, 1,3-propanediol, 1,4-butanediol, 1,5-pentanediol, 1,6-hexanediol, 1,2-propanediol, 1,3-butanediol, 2,3-butanediol, neopentyl glycol and hexylene glycol. Diethylene glycol, triethylene glycol and tetraethylene glycol are preferred as the ether glycol.

A polyester diol especially preferred for attaining the objects of this invention is a polyester diol comprising as the glycol component at least two members selected from ethylene glycol, 1,4-butanediol, 1,5-pentanediol and 1,6-hexanediol in an amount of at least 50% by weight and as the dicarboxylic component at least one member selected from adipic acid, pimelic acid and suberic acid and having an average molecular weight of 800 to 2000 and a solidification point below 20°C.

The degree of polymerization of the polyurethane prepolymer obtained by reacting the polyester diol with an organic polyisocyanate can be optionally adjusted so as to obtain desired strength and softness in the resulting polyurethane foam layer of the intended artificial leather of this invention.

As is apparent from the foregoing description, in this invention a paint is prepared by employing a polyurethane prepolymer formed by using the above-mentioned polyester diol as the starting material, and in this invention it is indispensable that the viscosity of the paint should be adjusted to 70 to 1000 poises. The viscosity referred to herein is a viscosity of the paint at the time of coating. The coating temperature varies to some extent but it is generally within a range of 10° to 30°C. The reason for limitation of the viscosity is as follows.

In case a paint having a viscosity lower than 70 poises is used for formation of an artificial leather, permeation of the paint into a substrate is caused to occur and the touch of the resulting artificial leather becomes hard. In contrast, when the viscosity of the paint is higher than 1000 poises, the coating operation becomes difficult and it is difficult to incorporate such additives as a catalyst, a foam stabilizer and the like uniformly and promptly into the paint. A paint having such a high viscosity is not suitable for the formation of artificial leathers, in which it is required to complete the preparation of a homogeneous paint promptly.

If the foaming ratio is extremely high, even though it is possible to adjust the foaming ratio by the post treatment detailed below, namely the treatment of passing the foamed layer between two rolls during the advance of the reaction, it is impossible to obtain a polyurethane foam having an optimum thickness for an artificial leather. The limitation of the [NCO]/[OH] ratio specified in this invention is one of important requirements for obtaining a most preferred final foaming ratio in the process of this invention. This [NCO]/[OH] ratio has also great influences on the viscosity of the paint and physical properties of the polyurethane foam layer, such as scratching strength. When this [NCO]/[OH] ratio reqirement is combined with other essential requirements, a most preferred [NCO]/[OH] ratio satisfying each of the foregoing requirements is within a range of from 2.0 to 4.0.

In this invention, it is specified that the paint is coated in an amount of 50 to 400 g/m². This requirement of the coating amount is important, in combination with the requirement of the clearance of two upper and lower rolls detailed hereinbelow, for attaining the complete adjustment of the foaming ratio. In case the amount coated of the paint is smaller than 50 g/m², sufficient foams are not included in the coating layer and hence, a good foam layer cannot be obtained, with the result that it is impossible to obtain an artificial leather having satisfactory thickness feeling and touch. When the coating amount is larger than 400 g/m², the thickness of the coating layer is too great and hence, gases are hardly passable through the coating layer and the foaming reaction is not smoothly advanced in the thickness direction of the coating layer. Accordingly, when the coating layer is maintained in a high humidity atmosphere for such a short time as several minutes, the advance of the reaction differs between the surface and central portions of the coating layer, and therefore, it takes a considerably long time to advance the reaction in the coating layer to such an extent that the layer can be subjected to the next step of passage through the clearance between the two rolls. Further, even if the foaming ratio can be adjusted to 2 to 4 by passing the layer through the clearance of the two rolls, the thickness of the finally formed layer of a polyurethane foam is too great and an artificial leather having a satisfactory touch cannot be obtained.

In this invention, the clearance between the two upper and lower rolls is controlled, in correspondence with the foamability of the paint used, namely the [NCO]/[OH] value and the amount coated of the paint, so that the final foaming ratio is 2 to 4. In this invention, a three-layer structure comprising the release paper, the paint layer and the substrate is passed through the so controlled clearance. However, the intended objects of this invention cannot be attained by passing it merely through the clearance. Namely, it is necessary that said passage should be performed during the advance of the reaction. More specifically, this requirement of the time for the passage of the layer structure through the clearance between the rolls exhibits a synergistic effect for adjusting the foaming ratio of the polyurethane foam layer together with the above-mentioned requirements of the [NCO]/[OH] value, the amount coated of the paint and the size of the clearance between the rolls. Further, this requirement of the time for the passage of the layer structure through the clearance between the rolls is also significant for improving the foam density, imparting a satisfactory surface scratching strength to the resulting artificial leather and, if an embossed release paper is employed, causing the surface of the polyurethane foam layer to adhere closely to the inner embossed face of the release paper. Accordingly, this requirement of the time for the passage of the layer structure through the clearance of the rolls is one of the important requirements of this invention.

In the polyurethane prepolymer paint layer formed on the release paper, the polymerization reaction proceeds subsequently to the foaming reaction, and if the advance of the polymerization reaction is examined with reference to the finger tackiness, the polymer is formed through the following stages; namely (1) the finger adheres to the coating layer, (2) the finger does not adhere to the coating layer but the surface still retains tackiness and (3) there is no surface tackiness but the layer is still in the state exhibiting plasticity. It is preferred that the layer structure is passed through the clearance between the rolls during the reaction at the stage (2) where the finger does not adhere to the coating layer but the surface still retains tackiness. This reaction is allowed to proceed in a high humidity atmosphere, and it is preferred that this reaction is advanced for 30 seconds to 5 minutes before the passage of the layer structure through the clearance between the two rolls.

In some cases, it is possible to provide a temperature difference between the two rolls and pass the layer structure through the clearance so that the release paper surface is contacted with the high temperature roll. In such case, a gradient of the foam density is formed in the thickness direction of the polyurethane foam layer. More specifically, the surface scratching strength of the polyurethane foam layer can be further improved. If this embodiment is adopted, it is preferred that one roll is maintained at a temperature lower than 80°C., the other roll is maintained at a temperature higher than 100°C. and the temperature difference between the two rolls is within the range of 80° – 200°C. If the temperature of the high temperature roll is lower than 100°C., the improvement of the foam density cannot be expected by the difference of the roll temperature. In case the low temperature roll is maintained at a temperature higher than 80°C., the foam density is made higher to some extent on the side having a contact with the low temperature roll, namely the substrate side, than the intended foam density that should result from the performed adjustment of the foaming state. Therefore, there is a fear that no desired gradient of the foam density can be obtained.

Further, in the practice of the process according to the present invention, a surface treatment of the artificial leather can be added by coating a polymer such as polyurethane resin, an amino acid resin and an acrylic resin on a release paper, preferably an embossed release paper, in advance and then coating th polyurethane prepolymer paint of the present invention thereon. In this case, an artificial leather having a thin layer of such polymer on its surface can be obtained.

As is apparent from the foregoing description, the foaming and polymerization reaction of the polyurethane prepolymer layer is caused to advance by utilizing heat and water, whereby a polyurethane foam layer is formed. Accordingly, the method for imparting water to the three-layer structure comprising the release paper, the paint layer and the substrate and conditions for this operation are also important in the process of this invention.

As the method for supplying water, there are ordinarily considered (1) a method in which water is impregnated in a substrate in advance and water is supplied from the substrate, (2) a method in which water is sprayed, and (3) a method in which the layer structure is maintained in a high humidity atmosphere. In order to attain the objects of this invention it is necessary to adopt the method (3). When other methods are adopted, the cell structure is roughened in the polyurethane foam layer and it is impossible to obtain a uniform skin film layer.

The conditions for the maintenance of the layer structure in a humidity atmosphere vary to some extent depending on the kind of a catalyst used, but it is indispensable that the dry-bulb temperature should be 40°to 95°C. and the relative humidity should be at least 60%, and it is preferred that the dry-bulb temperature is 45° to 80°C. and the relative humidity is at least 80%.

As the substrate, there are employed knitted and woven fabrics and non-woven fabrics in this invention. In some cases, a support capable of passing moisture therethrough, such as paper and the like, can be used in this invention.

For dyeing the polyurethane foam layer, there can be adopted a method in which a pigment is dispersed in the above-mentioned polyol component and then the polyol component is reacted with the isocyanate component to thereby form a colored polyurethane prepolymer, a method in which a pigment paste is incorporated in a polyurethane prepolymer after the formation thereof, and a method in which the polyurethane foam layer is dyed with a suitable dyestuff. It is possible to adopt two or more of the above methods in combination. As the dyestuff that can be used in the dyeing method, there are preferably employed acid dyes, metal-containing dyes and reactive dyes.

As the organic polyisocyanate which is one of polyurethane prepolymer-forming starting materials, there are preferably employed tolylene diisocyanate, 4,4'-diphenylmethane diisocyanate, xylene diisocyanate, hexamethylene diisocyanate, and the like.

In this invention, in view of the process steps for forming a polyurethane foam, it is preferred to add a foam stabilizer to the polyurethane prepolymer paint. The mechanisms of foaming and polymerization reactions caused during the process steps for forming a polyurethane foam by contacting a polyurethane prepolymer with water vapor have not completely been elucidated, but it is believed, as generally admitted in the art, that these reactions proceed according to the following mechanism:

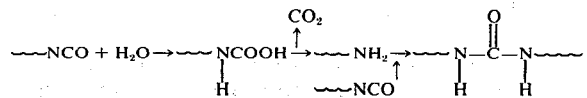

During the process of polymerization of the polyurethane prepolymer, carbon dioxide gas formed by the reaction acts as a blowing agent and performs an action of forming a polyurethane foam having a fine cellular structure.

For promotion of such polymerization and foaming reactions, it is preferred to use an amine catalyst such as N,N,N',N'-tetramethylhexamethylene diamine, N,N-dimethylcyclohexylamine, N,N,N',N',N'-pentamethyldiethylene triamine, N,N'-dimethybenzylamine, N,N,N',N'-tetramethylethylene diamine and triethylene diamine solely or in combination with a tin catalyst such as dibutyl tin dilaurate and stannous octate. It is especially preferred that N,N,N',N'-tetramethylhexamethylene diamine is used in combination with stannous octate or N,N,N',N'-tetramethylethylene diamine or triethylene diamine is used in combination with stannous octate.

This invention will now be described more detailedly by reference to the following Examples.

EXAMPLE 1

68.6 parts by weight of a polyester diol of a molecular weight of 1120 formed by the polyesterification reaction of ethylene glycol and 1,4-butanediol as the glycol component with adipic acid as the dicarboxylic acid component according to the customary method was mixed under agitation with 31.4 parts of tolylene diisocyanate (TDI 80) (the [NCO]/[OH] ratio being 2.94), and they were reacted at 85°C. for 2 hours to obtain a polyurethane prepolymer. 1 part of silicone oil as a foam stabilizer, 0.4 part of N,N,N',N'-tetramethylhexamethylene diamine and 0.3 part of stannous octate were added to 100 parts of the so formed polyurethane prepolymer, and the mixture was blended under agitation to obtain a paint having a viscosity of about 200 poises.

The so obtained paint was coated on a silicone-treated release paper in an amount of about 200 g/m², and a non-woven fibrous sheet of a thickness of 0.8 mm in which a polyurethane elastomer had been impregnated and solidified was bonded to the paint-coated release paper. Then, the assembly was maintained for 2 minutes and 30 seconds in an atmosphere having a dry-bulb temperature of 50°C. and a relative humidity of 90% to advance foaming and polymerization reactions. During the course of said reactions, when the finger tackiness was in such state that "the finger did not adhere to the surface of the paint layer but the paint layer surface still had tackiness", the assembly was passed through a clearance of 1.2 mm formed between two metal rolls, the surfaces of which were maintained at room temperature. Then, the layer assembly was placed in a drier maintained at 130°C. for 3 minutes to further advance the foaming and polymerization reactions, and the release paper was peeled from the assembly.

Then, the so obtained colorless artificial leather was dyed with an acid dye. Thus was obtained an artificial leather resembling a natural leather quite well in respect to touch and feeling and having high air permeability and high surface scratching strength.

EXAMPLE 2

65.0 parts of the same polyester diol as used in Example 1 was mixed under agitation with 35.0 parts of tolylene diisocyanate (the [NCO]/[OH] ratio being 3.5), and they were reacted at 85°C. for 2 hours to obtain a polyurethane prepolymer. 10 parts of a paste of carbon black (DOP ¼) containing 1 part of silicone oil as a foam stabilizer, 0.3 part of tetramethylhexamethylene diamine and 0.3 part of stannous octate was added to 100 parts of the so formed polyurethane prepolymer, and the mixture was blended under agitation to form a paint having a viscosity of about 130 poises.

The so formed paint was coated on an embossed release paper, on which a thin layer of an amino acid resin paint was provided in advance, in an amount of about 150 g/m², and a non-woven fibrous sheet of a thickness of 0.8 mm in which a polyurethane elastomer had been impregnated and solidified was bonded to the paint-coated release paper. The assembly was maintained for 3 minutes in an atmosphere having a dry-bulb temperature of 50°C. and a relative humidity of 90% to thereby advance foaming and polymerization reactions. During the course of said reactions, when the finger tackiness was in such state that "the finger did not adhere to the surface of the paint layer but the paint layer surface still had tackiness", the assembly was passed through a clearance of 1.30 mm formed between a metal roll, the surface of which was maintained at 150°C., and a metal roll, the surface of which was maintained at room temperature (about 20°C.), so that the embossed release paper side was contacted with the metal roll and the polyurethane foam layer was made to adhere closely to the embossment pattern of the release paper, whereby the foam density was heightened on the surface side of the polyurethane foam layer and the foam density gradient was formed in the thickness direction of the foam layer. Then, the foam layer was further reacted in a dryer of 130°C. for 3 minutes, and the embossed release paper was peeled. Thus was obtained an artificial leather having a thin layer of the amino acid resin and a clear embossment pattern on its surface which have high surface strength and resembles a natural leather quite well.

EXAMPLE 3

A paint of a viscosity of about 200 poises prepared in the same manner as in Example 1 was coated on a silicone-treated release paper in an amount of about 250 g/m², and a hoisery fabric was bonded thereto. The assembly was maintained for 2 minutes and 20 seconds in an atmosphere having a dry-bulb temperature of 50°C. and a relative humidity of 90% to advance foaming and polymerization reactions. During the course of said reactions, when the finger tackiness was in such state that "the finger did not adhere to the surface of the paint layer but the paint layer surface still had tackiness", the assembly was passed through a clearance of 1.2 mm formed between two rolls, the surfaces of which were maintained at room temperature, so that the release paper side was contacted with the metal roll surface. Then, the paint layer was further reacted for 3 minutes in a heating furnace maintained at 130°C., and the release paper was peeled. Then, the product was dyed with a metal-containing dyestuff. Thus was obtained an artificial leather having high surface scratching strength and high air permeability and resembling a natural leather quite well in respect to touch, feeling and appearance.

EXAMPLE 4

70.6 parts by weight of a polyester diol of a molecular weight of 1120 formed by polyesterifying ethylene glycol and 1,4-butanediol as the glycol component with adipic acid as the dicarboxylic acid component according to the customary method was mixed under agitation with 29.4 parts of tolylene diisocyanate (TDI 80) (the [NCO]/[OH] ratio being 2.12), and they were reacted at 85°C. for 2 hours to obtain a polyurethane prepolymer. 1 part of silicone oil as a foam stabilizer, 0.6 part of 33% solution of triethylene diamine in ethylene glycol and 0.3 part of stannous octate were added to 100 parts of the so formed polyurethane prepolymer, and the mixture was blended under agitation to obtain a paint having a viscosity of about 950 poises.

The so obtained paint was coated on a silicone-treated release paper in an amount of about 200 g/m², and a non-woven fibrous sheet of a thickness of 0.8 mm in which a polyurethane elastomer had been impregnated and solidified was bonded to the paint-coated release paper. Then, the assembly was maintained for 2 minutes and 30 seconds in an atmosphere having a dry-bulb temperature of 50°C. and a relative humidity of 90% to advance foaming and polymerization reactions. During the course of said reactions, when the finger tackiness was in such state that "the finger did not adhere to the surface of the paint layer but the paint layer surface still had tackiness", the assembly was passed through a clearance of 1.2 mm formed between two metal rolls, the surfaces of which were maintained at room temperature. Then, the layer assembly was placed in a drier maintained at 130°C. for 3 minutes to further advance the foaming and polymerization reactions, and the release paper was peeled from the assembly.

Then, the so obtained colorless artificial leather was dyed with an acid dye. Thus was obtained an artificial leather resembling a natural leather quite well in respect to touch and feeling and having high air permeability and high surface scratching strength.

What we claim is:

1. A process for preparing air-permeable artificial leather having excellent surface scratching strength which comprises
   1. forming a liquid mixture consisting essentially of
       a. an isocyanate-terminated polyurethane prepolymer prepared by reacting (1) a polyester diol derived from an aliphatic dicarboxylic acid, with (2) an organic polyisocyanate, wherein the ratio of isocyanate group equivalent/hydroxyl group equivalent is from 2.0 to 4.0/1.0,
       b. an effective amount of a foam stabilizer for a polyurethane foam, and
       c. an effective amount of a catalyst for polymerizing the polyurethane prepolymer
   said mixture being substantially solvent-free and water-free and having a viscosity of from 70 to 1000 poises;
   2. coating a surface coating film of said liquid mixture onto a release paper in an amount of from 50 to 400 grams of said liquid mixture per square meter of said release paper;

3. applying a water vapor-permeable substrate to the exposed surface of said coating film on said release paper to form a sandwich in which said film is between said release paper and said substrate;
4. moving said sandwich through an ambient atmosphere of high humidity having a dry bulb temperature of from 40° to 95°C and a relative humidity of at least 60%, for a time period of from 30 seconds to 5 minutes, so that a foaming reaction proceeds across the thickness of the film beginning adjacent the substrate and moving toward the release paper, caused by contact of water vapor in said atmosphere with said film to generate carbon dioxide gas whereby to foam said film;
5. while maintaining said foamed film in said sandwich relationship with said release paper and said substrate and at a time when the foamed film still retains tackiness but does not stick to the fingers, moving the sandwich between a pair of rolls which are spaced apart a distance of from 2 to 4 times the initial thickness of the film prior to foaming, to control the thickness of the foamed film;
6. completing the foaming and polymerization reactions; and
7. removing the release sheet from the sandwich whereby to obtain a foamed microporous polyurethane sheet bonded to said substrate as a final artificial leather product.

2. A process according to claim 1, wherein said polyester diol is a polyol prepared by polycondensation of aliphatic dicarboxylic acids with straight or branched glycols or ether glycols.

3. A process according to claim 2, wherein at least two members selected from straight and branched glycols having 2 to 6 carbon atoms and ether glycols having different numbers of carbon atoms are employed as the glycol component and they are polycondensed with at least one aliphatic dicarboxylic acid having 4 to 10 carbon atoms to form said polyester diol.

4. A process according to claim 3, wherein at least two members selected from ethylene glycol, 1,4-butanediol, 1,5-pentanediol and 1,6-hexanediol are employed as the glycol component and they are polycondensed with at least one member selected from adipic acid, pimelic acid and suberic acid to obtain a polyester diol having an average molecular weight of 800 to 2000 and a solidification point below 20°C.

5. A process according to claim 1, wherein said release paper is an embossed release paper.

6. A process according to claim 1, wherein a thin layer of a polymer is provided on the release paper prior to coating said film thereon whereby the final artificial leather product has a thin layer of said polymer on its surface.

7. A process according to claim 6, wherein said polymer is an amino acid resin paint.

8. A process according to claim 10, wherein one roll is maintained at a temperature lower than 80°C., the other roll is maintained at a temperature higher than 100°C. and the temperature difference between the two rolls is within the range of 80° to 200°C., and the release paper surface is contacted with the latter high temperature roll.

9. A process as claimed in claim 1, wherein said catalyst consists of an amine catalyst or an amine catalyst and a tin catalyst.

10. A process as claimed in claim 9, in which said catalyst consists of an amine selected from the group consisting of N,N,N',N'-tetramethylhexamethylene diamine, N,N,N',N'-tetramethylethylene diamine and triethylene diamine, and stannous octate.

* * * * *

UNITED STATES PATENT AND TRADEMARK OFFICE
CERTIFICATE OF CORRECTION

PATENT NO. : 3,959,049
DATED : May 25, 1976
INVENTOR(S) : Yoshinobu Tanaka et al It is certified that error appears in the above-identified patent and that said Letters Patent are hereby corrected as shown below:

Col. 12, line 21; delete "Claim 10" and replace by

---Claim 1---.

Signed and Sealed this

Twenty-eighth Day of September 1976

[SEAL]

Attest:

RUTH C. MASON
Attesting Officer

C. MARSHALL DANN
Commissioner of Patents and Trademarks